United States Patent [19]

Khalil et al.

[11] Patent Number: 5,288,797
[45] Date of Patent: Feb. 22, 1994

[54] MOISTURE CURABLE POLYURETHANE COMPOSITION

[75] Inventors: Hamdy Khalil, Willowdale; Witek Majewski, Breslau; George Nickel; George Wypych, both of Toronto; Jeffrey D. van Heumen, Guelph, all of Canada

[73] Assignee: Tremco Ltd., Toronto, Canada

[21] Appl. No.: 34,454

[22] Filed: Mar. 19, 1993

Related U.S. Application Data

[63] Continuation of Ser. No. 870,523, Apr. 17, 1992, abandoned.

[51] Int. Cl.$^5$ .............................................. C08L 75/04
[52] U.S. Cl. ..................... 524/872; 524/590; 528/59; 252/182.22; 525/424
[58] Field of Search ................ 524/872, 590; 528/59; 252/182.22; 525/424

[56] References Cited

U.S. PATENT DOCUMENTS 4,097,442  7/1978  Kieft et al. ..................... 524/872

*Primary Examiner*—Maurice J. Welsh
*Attorney, Agent, or Firm*—David P. Dureska; Daniel J. Hudak

[57] ABSTRACT

A one-part moisture curable polyurethane adhesive composition comprises a blend of polyurethane prepolymers and one or more additives which unexpectedly improve the sag resistance and mechanical properties of the formulation. The final adhesive composition retains good stability in the absence of moisture for an extended period between manufacture and application of the adhesive, and has a relatively rapid and consistent cure rate in the presence of atmospheric moisture. The final cured composition exhibits good mechanical properties and generally is unaffected by ambient application and cure conditions.

30 Claims, No Drawings

MOISTURE CURABLE POLYURETHANE COMPOSITION

This application is a continuation of application Ser. No. 07/870,523 filed Apr. 17, 1992, now abandoned.

FIELD OF THE INVENTION

The present invention relates to moisture curable polyurethane compositions, and in particular to polyurethane compositions curable by ambient moisture which are useful as adhesives or sealants and the like. More specifically, the invention relates to such moisture curable polyurethane adhesive/sealant compositions comprising a blend of polyurethane prepolymers and one or more additives for improving the sag resistance of the composition.

BACKGROUND INFORMATION

Polyurethane compositions have been used as sealants or adhesives for many years. Polyurethane adhesives or sealants in general have relatively high bond strengths, flexibility, shock and impact resistance, fatigue resistance, and the like. This set of highly desirable properties primarily arises from a crosslinking reaction, known as curing, which is designed to occur once the adhesive or sealant is applied. As the adhesive or sealant cures, it transforms from a soft, workable liquid or semi-liquid to a firm, resilient, elastomeric solid. It is to be understood that hereinafter, the term adhesive will be used in the identification of the polyurethane composition of the present invention, and is meant to encompass the term sealant or any other term which might be used in identifying such polyurethane compositions as are described immediately above.

Polymeric adhesives therefore are sold in a non-cured form containing polymerizable components which are designed to cure upon application. Many such adhesives are created from a prepolymer component and a curative component. Typically for polyurethane compositions, the prepolymer component is the reaction product of a polyol and an organic polyisocyanate having isocyanate functional groups in a weight percent amount of from about 0.5% to about 10%, and more typically from about 1% to about 4% based on the weight of the prepolymer. The curative generally is a reactive hydrogen-containing material.

The prepolymer and curative components of the polyurethane adhesive composition can be packaged separately creating so-called two-part or two-step products. Two-step systems, which posses many desirable characteristics, generally require mixing just prior to application, and such mixing is often found to be inconvenient and problematic. Therefore, one-step systems containing all components of a polyurethane adhesive composition in a single package are preferred by many end users. Such one-step polyurethane compositions generally will cure due to ambient conditions, and most often due to moisture in the air. In polyurethane systems, ambient moisture can react with the isocyanate reactive sites and cause polymerization directly or can react with an intermediary, such as oxazolidine or ketimine, to produce a reaction product (typically an amine) which, in turn, causes curing. Even if the system is the one-part type, the adhesive composition usually also will contain sufficient urethane catalyst to produce a desired cure time. The above-described one- and two-part polyurethane adhesives are widely employed in many industries, including the motor vehicle and construction industries.

For application to vertically-oriented areas, such as wall surfaces or window frames, an adhesive material is required to have non-sag characteristics, i.e. be substantially free from or resistant to sagging or slumping after application. A non-sag type adhesive material should flow easily when subjected to external forces during its mixing and application, but should be free from flow when it is at a standstill and therefore should exhibit a substantial increase in apparent viscosity. Such behaviour is generally described as thixotropic or yield stress related. It is to be understood that for purposes of further discussion hereinbelow, the term "sag" encompasses two types of sag identified by those having ordinary skill in the art: (i) immediate sag which generally manifests itself immediately upon manufacture of the material, and (ii) latent sag, which develops during storage of the material.

Sag-resistant polyurethane adhesives generally are known in the art, but can have drawbacks. Such materials require a precisely optimized formulation which may be unforgiving if any errors occur during the manufacturing process. Moreover, these materials are sometimes also sensitive to the storage and curing temperatures which can adversely affect the anti-sag properties and the mechanical properties of the cured product.

Heretofore, the known methods of enhancing the non-sag characteristics in polyurethane adhesive-products included:

1. the use of special sag-resistant additives, usually castor oil derivatives;
2. the utilization of highly structured fillers with high surface areas which tended to agglomerate, such as different grades of carbon black and amorphous silica;
3. the use of high concentrations of certain fillers or filler combinations such as special grades of calcium carbonate; or
4. the utilization of swellable polymers such as polyvinyl chloride.

Each of these non-sag enhancement systems of the known prior art have serious disadvantages:

1. Castor oil derivatives and other commercially available non-sag additives are reactive with isocyanate groups, and therefore, the polyurethane products formulated therewith have limited storage stability which has a detrimental effect on their practical usefulness.
2. Amorphous silica causes serious shrinkage problems during cure of the polyurethane product and frequently causes adhesion problems.
3. Polyvinyl chloride requires a very precise manufacturing process and the final polyurethane product usually has limited ultraviolet light (UV) stability.
4. Carbon black can be used for manufacturing of black polyurethane products only.
5. In order to achieve the required non-sag properties, the concentration of carbon black or other fillers must be close to that of the critical pigment volume concentration value, and this may create some difficulties in manufacturing thereby adversely affecting the final mechanical properties of the polyurethane product.

Urethane materials known in the art generally comprise in addition to the urethane prepolymer, curative catalyst and conventional non-sag additive as described above, a plasticizer and/or solvent, fillers, an adhesion improver, pigment(s), UV stabilizers, and a moisture scavenger. The fillers contribute to increasing the volume of sealant material, and also to adjusting the mechanical properties such as hardness and tensile properties.

In particular, polyurethane adhesive compositions lacking fillers generally exhibit low sag resistance, and therefore fillers have generally routinely been incorporated therein to develop or increase sag resistance where such resistance is needed. Unfortunately, this technique also increases the viscosity of the component or components containing the filler. Therefore, loading with high levels of filler partially increases sag resistance, but typically results in difficulties in obtaining satisfactory mixing because shear mixing equipment and high pressure pumping equipment generally are needed. Furthermore, high filler loading in many cases tends to lower the strength of the adhesive bond and typically decreases elasticity. The increased viscosity typically makes the adhesive more difficult to apply.

As discussed hereinabove, polyurethane adhesives display many highly desirable properties primarily due to the crosslinking reaction or curing which takes place once the adhesive is applied. However, the mechanical properties of the cured adhesive are directly related to curing conditions. The mechanical properties of many known prior art polyurethane adhesive formulations are adversely affected by changes in ambient conditions during curing.

Conventional compounding techniques make it possible to vary the elastomeric properties and flow properties of a polyurethane adhesive composition, but it generally has been very difficult to achieve the desired combination of manufacturing ease, extrudability, non-sag properties, and good mechanical properties merely by judicious choice of compounding conventional ingredients.

Thus, the need exists for a moisture curable one-part polyurethane adhesive composition having good stability in the absence of moisture and a generally rapid cure rate in the presence of atmospheric moisture, and which is sag-resistant and exhibits suitable mechanical properties after cure despite variations in ambient conditions during application and curing of the adhesive.

SUMMARY OF THE INVENTION

It is an object of the present invention to provide a one-part, moisture curable polyurethane adhesive composition having improved sag resistant properties and mechanical properties.

It is a further object of the invention to provide such a polyurethane adhesive composition which is stable for an extended period between manufacture and application of the adhesive.

It is another object of the invention to provide such a composition which upon application cures relatively rapidly, consistently and without adversely affecting the mechanical properties of the final cured product, regardless of the ambient conditions.

It is another object of the invention to provide a composition which is suitable for use in a variety of adhesive applications, and which is economical to manufacture and easy to use.

These objects and advantages are obtained by the polyurethane adhesive composition of the present invention, comprising a blend of polyurethane prepolymers and additives including carbon black and a resin having a polyamide backbone for improving the mechanical properties and sag-resistant properties of the adhesive composition.

DESCRIPTION OF THE PREFERRED EMBODIMENTS

The formulation of a first embodiment of the moisture curable polyurethane adhesive composition of the present invention is set forth below.

In accordance with one of the main features of the first embodiment of the present invention, a novel blend of polyurethane prepolymers unexpectedly results in a one-part moisture curable adhesive composition having improved sag resistance. The particular catalyst, additives and fillers used with the prepolymer blend to form the adhesive composition, is dependent on the desired end-use application.

With regard to the prepolymer blend, a blend of at least two polyurethane polymers is utilized to enhance the immediate non-sag properties of the one-part moisture curable sealant composition. A first prepolymer for use in the prepolymer blend will hereafter be denoted Prepolymer A. Prepolymer A is a reaction product of a polyol and an isocyanate. Polyols useful in the formation of Prepolymer A include linear or branched polyols with backbones of polyacrylate, polybutadiene, polycarbonate, polycaprolactone, polyether, polyester, polythioether, and polyurethanes, each of which have at least two terminal primary and/or secondary -OH groups. Polyols having polyether backbones are desired and include polyoxyethylene, polyoxypropylene, copolymers of polyoxyethylene and polyoxypropylene, polyoxyethylene, and polyoxytetramethylene polyols. Polyoxypropylene triol is preferred.

Isocyanates useful in the preparation of Prepolymer A of the first embodiment of the present invention desirably are aromatic (poly)isocyanates such as 4,4'-diphenylmethanediisocyanate (MDI), toluene-diisocyanate, naphthylene-1,5-diisocyanate, 1,3- and 1,4-phenylenediisocyanate, triphenylmethane-4,4',4''-triisocyanate, and polyphenylpolymethylenepolyisocyanates, as well as derivatives of the above compounds. A preferred compound is 4,4'-diphenylmethanediisocyanate (MDI).

Prepolymer A has a molecular weight of from about 1,000 to about 20,000, desirably from about 2,000 to about 7,000, and preferably from about 4,000 to about 7,000. The functionality of prepolymer A is from about 1.6 to about 3.0 and preferably from about 1.7 to about 2.4.

A second polyurethane prepolymer for use in the prepolymer blend will hereafter be denoted Prepolymer C. Prepolymer C is a reaction product of a polyol and an isocyanate. The compounds useful as the polyol for Prepolymer C are the same as those set forth above for Prepolymer A. The isocyanate useful in the reaction with the selected polyol to form Prepolymer C desirably is an aliphatic or cycloaliphatic (poly)isocyanate such as hexamethylenediisocyanate, 1,12-dodecanediisocyanate, cyclobutane-1,3-diisocyanate, cyclohexane-1,3- and 1,4-diisocyanate, 1-isocyanato-3,3,5-trimethyl-5-isocyanate-methylcyclohexane, 2,4- and 2,6-hexahydrotolyene-diisocyanate, hexahydro-1,3- and -1,4 -phenyidiisocyanate, and perhydro-2,4'- and -4,4'-dicyclohexylmethanediisocyanate ($H_{12}$MDI). The preferred isocyanate is $H_{12}$MDI. Prepolymer C has a molecular weight of from about 1,000 to about 20,000, desirably from about 2,000 to about 7,000, and preferably from about 4,000 to about 7,000. Prepolymer C has a functionality of from about 1.6 to about 3.0 and preferably from about 1.7 to about 2.4.

In accordance with one of the key features of the first embodiment of the present invention, Prepolymers A and/or C described above are blended with a third polyurethane prepolymer hereafter denoted as Prepolymer B, which also is the reaction product of a polyol and an isocyanate. A polyol useful in the formation of Prepolymer B can be any of those listed above for Prepolymers A and C, so long as the selected polyol is different from those used in Prepolymers A and/or C. The polyol used in the formation of Prepolymer B desirably is a polyol having a polyether backbone such as polyoxyethylene, polyoxypropylene, copolymers of polyoxyethylene and polyoxypropylene, polyoxybutylene, polyoxytetramethylene, or any of the polyols having a polyester backbone which are well known to those having ordinary skill in the polyurethane art. The preferred polyol for use in forming Prepolymer B of the first embodiment of the present invention is polyoxytetramethylene (PTMG) or polycaprolactone (PCL). The isocyanate used in the formation of Prepolymer B can be any of those listed above for Prepolymers A and C. The preferred isocyanate is MDI. The molecular weight of Prepolymer B preferably is from about 500 to about 3,000. The functionality of Prepolymer B is from about 1.6 to about 3.0 and preferably from about 1.7 to about 2.4.

The amount of each polyurethane prepolymer used, based on 100 parts by weight of the blend of the three prepolymers, is from about 98 parts to about 50 parts of Prepolymer A, from about 1 to about 10 parts of Prepolymer B and from about 1 to about 40 parts of Prepolymer C. Desirably from about 79 to about 67 parts of Prepolymer A, from about 1 to about 3 parts of Prepolymer B and from about 20 to about 30 parts of Prepolymer C are used. Preferably, about 68 parts of Prepolymer A is utilized, about 2 parts of Prepolymer B and about 30 parts of Prepolymer C. The amount range of Prepolymer B used relative to the overall prepolymer blend remains the same regardless of whether only one or both of Prepolymers A and C are included in the formulation. It is theorized, though not fully understood or proven, that the unexpectedly improved non-sag properties of the formulation of the first embodiment of the present invention stem from the use of generally incompatible polyols in the formation of Prepolymers A and/or C and Prepolymer B, respectively. It is thought that some incompatibility of these polyols provides the sag resistance of the overall formulation.

Additives useful in the moisture curable one-step polyurethane adhesive composition of the first embodiment of the present invention are set forth below. These additives include plasticizers useful for lowering the viscosity and increasing the elongation of the composition. Plasticizers useful in the formulation include phthalates such as dibutyl-, dioctyl-, dicyclohexyl-, diisooctyl-, diisodecyl-, dibenzyl-, or butylbenzylphthalate; phosphates such as trioctylphosphate or diphenyloctylphosphate; adipates such as dioctyladipate or benzyloctyladipate; sulfonic acid esters, sulfoneamides, chloroparaffines, and polybutenes. Dioctylterephthalate (DOTP) is preferred.

Carbon black is utilized as a filler and an additive for improving mechanical properties of the composition together with the non-sag properties and UV stability thereof. The preferred carbon black is one which conforms to ASTM N330. Carbon black is utilized in an amount of from about 6 to about 24 weight percent based on the weight of the entire adhesive formulation, and preferably from about 16 to about 20 weight percent.

Another additive used is an isocyanate protecting agent which also acts as a diluent in the formulation and preferably is diethyl malonate. The formulation further includes a moisture scavenger which can be any of those which are well known in the art. Other additives utilized include, but are not limited to, adhesion promoters, fungicides, UV stabilizers, and the like, all of which are well known to those having ordinary skill in the polyurethane art.

Conventional fillers and reinforcing agents are optional and include calcium carbonate, carbon black, diatomacious earth, titanium dioxide, silica, talc, calcium silicate, Wollastonite, Abestine, Kaolin, barium sulfate, graphite, hydrated alumina, serpentine, mica, glass beads, fiberglass, nylon fiber, polyester fiber, alpha-cellulose fiber, polypropylene fiber, and like. Inclusion or deletion of the optional fillers depends on the specific application for which the polyurethane composition is being utilized.

A catalyst for use in the present invention is a cocatalyst comprising Catalysts I and II. Catalyst I is an organometallic catalyst which includes: (i) naphthenate or octoate salts of heavy metals such as tin, lead, bismuth, cobalt and manganese, or (ii) organometallic compounds such as dibutyl tin malate, dibutyl tin dilaureate and dibutyl tin diacetate, with dibutyl tin diacetate being preferred. Catalyst II is a tertiary amine or other nitrogen-containing material such as N-alkyl morphilene, N-alkyl aliphatic polyamine, N-alkyl piperazine, triethylenediamine, dimorpholinodiethylether (DMDEE) and bis-2-N,N-dimethyl aminoethyl ether which is commercially available from Union Carbide under the name Niax-A99. DMDEE is preferred. Catalyst I is used in a weight percent amount based on the total weight of the composition, of from about 0 to about 2 weight percent, desirably from about 0 to about 0.5 weight percent, and preferably from about 0 to about 0.3 weight percent. Catalyst II is used in an amount of from about 0 to about 2 weight percent, desirably from about 0 to about 0.5 weight percent, and preferably from about 0 to about 0.19 weight percent.

It is to be understood that the method of preparation of the polyurethane prepolymers discussed above is well known in the art and literature (see "Polyurethane Handbook" G. Oertel (Editor) Hanser Publishers, 1985).

The first embodiment of the present invention is illustrated through and will be better understood by reference to the following examples.

EXAMPLE I

Prepolymer A': Branched Polyether Urethane Prepolymer

A polyurethane prepolymer was prepared by blending 80 grams of polyoxy-propylene triol (hydroxyl number of 28) with 11 grams of 4,4'-diphenylmethanediisocyanate (MDI) and 9 grams of dioctylphthalate. A tin catalyst was used in an amount of 0.001 grams. The mixture was heated to 85° C. and maintained at this temperature until the isocyanate concentration dropped to 1.6%. The resulting prepolymer had a viscosity of 45.8 Pascal seconds.

EXAMPLE II

Prepolymer A'': Straight Chain Polyether Urethane Prepolymer

Another polyurethane prepolymer was prepared by blending 70 grams of polyoxy-propylene diol (hydroxyl number of 56), 19 grams of 4,4'-diphenylmethanediisocyanate (MDI), and 9.9 grams of dioctylphthalate.

The reaction mixture temperature was raised to 85° C. and when the isocyanate concentration dropped to 3.6%, 0.76 g of ethylene glycol was added. After one hour, the isocyanate concentration dropped to 2.5%. The resulting prepolymer had a viscosity of 33.4 Pascal seconds.

EXAMPLE III

Prepolymer B: Non-Sag Agent

A polyurethane prepolymer was prepared by adding 59 grams of polyoxytetramethylene diol (PTMG) (Mw=1000) with 32 grams of 4,4'-diphenylmethane diisocyanate (MDI) and 9 grams of dioctylphthalate. The ensuing exothermic reaction was maintained at 80° C. until the isocyanate concentration dropped to 5.6%. The viscosity of the resulting prepolymer was 17.3 Pascal seconds.

EXAMPLE IV

Final Adhesive Composition

A number of adhesive compositions were made using a blend of the above-described prepolymers. In the blend of prepolymers A' and A'', the filler (carbon black) was uniformly dispersed. Dioctylphthalate was used as plasticizer. Additives included molecular sieves (drying agents) and phosphoric acid (catalyst/moderator). Prepolymer B was added as the final component of the adhesive formulations.

The compounded adhesives were tested for sag according to ASTM D2202-88 and viscosity per standard test #204A. The results are summarized below. All amounts listed in the table are parts by weight based on the total weight of the adhesive formulation.

| Formulation | a | b | c | d | e | f | g |
|---|---|---|---|---|---|---|---|
| Prepolymer B | 0 | 1 | 2 | 4 | 6 | 8 | 10 |
| Prepolymer A' | 40 | 39 | 38 | 36 | 34 | 32 | 30 |
| Prepolymer A'' | 60 | 60 | 60 | 60 | 60 | 60 | 60 |
| Misc. Fillers and Additives | 47 | 47 | 47 | 47 | 47 | 47 | 47 |
| Sag[1] | ∞ | 0.11 | 0.04 | 0.02 | 0.02 | 0.01 | 0.02 |
| Flow[2] | 32 | 30 | 31 | 30 | 36 | 33 | 28 |

[1]ASTM D2202-88
[2]Standard Test #204A

The above examples and table show that a very small amount (1% or less) of the non-sag agent or Prepolymer B, dramatically improves the sag performance of the adhesive as compared to formulation "a" which is free of Prepolymer B.

A second embodiment of the one-part moisture curable polyurethane adhesive composition of the present invention is made utilizing substantially the same prepolymers, catalysts and additives as described above for the formulation of the first embodiment of the present invention, including the ranges of molecular weights, functionaltities, amounts, and the like, with such description being fully incorporated by reference herein. However, the difference in the second embodiment from the first embodiment is that in the second embodiment, Prepolymers A and/or B, both of which are aromatic prepolymers, are blended with Prepolymer C, which is an aliphatic prepolymer. In accordance with the key feature of the second embodiment of the invention, the utilization of a blend of aromatic and aliphatic prepolymers produces an unexpected improvement in the mechanical properties of the final cured adhesive and particularly tensile strength and elongation.

The second embodiment of the present invention is illustrated through and will be better understood by reference to the following examples:

EXAMPLE V

Preparation of Prepolymer A

Polyurethane Prepolymer A was prepared by blending 2100 g of polyoxypropylene triol having a hydroxyl number of 28, with 265 g dioctylphthalate. Subsequently, 275 g of 4,4'-diphenylmethane diisocyanate (MDI) and 0.10 g dibutyl tin dilaureate were added. The reaction temperature was raised to 85° C. and maintained at this level until the isocyanate concentration dropped to 1.9%.

The resulting prepolymer was a light yellow liquid having a viscosity of 26.7 Pas.

EXAMPLE VI

Preparation of Prepolymer B

Polyurethane Prepolymer B was prepared by blending 1111 g of polyoxytetramethylene (PTMG) having a molecular weight of 1000, with 611 g of 4,4'-diphenylmethane diisocyanate (MDI) and 170 g dioctylphthalate. The reaction was maintained at 70° C. until the isocyanate concentration dropped to 5.6%.

The resulting prepolymer was transparent and light yellow having a viscosity of 17.3 Pps.

EXAMPLE VII

Preparation of Prepolymer C—Mechanical Property Improving Agent

Polyurethane Prepolymer C was prepared by blending 5306 g of polyoxypropylene diol, having a hydroxyl number of 28, with 696 g of 4,4'-dicyclohexylmethane diisocyanate ($H_{12}$MDI) and 0.1 g of dibutyl tin dilaurate. The temperature was raised to 90° C. and maintained until the isocyanate concentration dropped to 1.85%.

The resulting prepolymer was colourless, transparent and had a viscosity of 7.0 Pas.

EXAMPLE VIII

Comparative Example—Blend of Prepolymers A and B Only

An adhesive was compounded by blending 1960 g of Prepolymer A from Example V, 40 g of Prepolymer B from Example VI and 6 g of dibutyl tin dilaurate. Then, 500 g of carbon black filler was dispersed in the blend. The resulting adhesive was horizontally applied as a 3 mm thick layer. After five days the tensile and elongation properties of the cured film were evaluated.

The results showed a tensile strength of 2.38 MPa and an elongation of 250%.

EXAMPLE IX

Aromatic Prepolymer Blend Containing Aliphatic Isocyanate Compound Additive

Another adhesive was compounded as in Example VIII, but additionally 80 g of 4,4'-dicyclohexylmethane diisocyanate ($H_{12}MDI$) was added to the composition. The resulting sealant was horizontally applied as a 3 mm thick layer. After five days the tensile and elongation properties of the cured film were evaluated.

The results showed a tensile strength of 5.45 MPa and an elongation of 290%. These results show that addition of an aliphatic polyisocyanate alone to an adhesive formulation containing only aromatic isocyanate-terminated prepolymers, improves tensile strength and elongation properties.

EXAMPLE X

Blend of Aromatic and Aliphatic Polyurethane Prepolymers

Another adhesive was compounded by blending 1360 g of the Prepolymer A from Example V, 40 g of Prepolymer B from Example VI and 600 g of Prepolymer C from Example VII. Subsequently, 200 g of dioctylphthalate and 6 g of dibutyl tin dilaurate were added to the formulation. Then, 500 g of carbon black filler was dispersed in the blend. The resulting adhesive was horizontally applied as a 3 mm thick layer. After five days the tensile and elongation properties were evaluated.

The results showed a tensile strength of 7.1 MPa and an elongation of 660%. These results show that although addition of only an aliphatic polyisocyanate to an aromatic polyurethane prepolymer improves tensile and elongation properties as in Example IX, addition of an aliphatic polyurethane prepolymer to an aromatic polyurethane prepolymer improves these properties even more dramatically.

A third embodiment of the one-part moisture curable polyurethane adhesive composition of the present invention incorporates substantially the same prepolymers, catalysts, and additives as set forth above for the first two embodiments of the present invention, including the ranges of molecular weights, functionalities, amounts, and the like, said description being hereby fully incorporated by reference. However, in accordance with the key feature of the third embodiment of the invention, addition of a resin having a polyamide backbone to the adhesive formulation, which includes Prepolymers A, B, and C, unexpectedly results in improved immediate-type and latent-type sag-resistance for the composition. A preferred polyamide is available from Rheox, Inc., of Hightstown, N.J. 08520, and is identified as EA-2122. The polyamide is added to the formulation in an amount of from about 0.2 to about 10 weight percent based on the weight of the entire formulation, and preferably from about 1 to about 4 weight percent.

Although the mechanism is not fully understood by which such unexpectedly improved sag-resistant properties are achieved through addition of the resin having a polyamide backbone to the formulation, a mechanism is thought to operate in the following manner. The phenomenon of latent sag, which has previously been defined herein, has heretofore been a problem in many prior art one-part moisture curable polyurethane compositions. Such "latent sag" is caused by moisture absorption during manufacture of the polyurethane composition and raw materials, or diffuses through a storage cartridge wall. The undesirable moisture reacts with isocyanate groups forming intermediate complexes which react with other isocyanate groups causing the formation of polyurea. Absorption of moisture and subsequent formation of polyurea affects non-sag properties of such polyurethane compositions and the phenomenon applies equally to systems in which carbon black, fillers, castor oil derivatives, and the like are utilized as the main component providing sag-resistance to the system. Heretofore, industry has handled this problem by attempting to eliminate water from adhesive composition manufacture and storage, which has achieved only limited success. The third embodiment of the present invention containing the resin having a polyamide backbone, unexpectedly solves this problem by improving latent sag in addition to immediate sag.

The third embodiment of the present invention will be better understood by the following examples.

EXAMPLE XI

Comparative 100 parts of a blend of polyurethane Prepolymers A, B, and C made as in Example X, was compounded with 25 parts of carbon black in a moisture-free atmosphere. The product was stored for 30 days in 50° C. oven and exhibited a latent sag of 1.1 inch and a flow 42 s/20 g. Prior to oven-treatment the immediate sag of the product was 0 and the flow was 25 s/20 g.

EXAMPLE XII

To a mixture made in accordance with Example XI, was added 1 part of resin having a polyamide backbone. Immediate sag was 0.01 inch and flow was 27 s/20 g. After 30 days in a 50° C. oven, latent sag was 0.5 inch and flow 78 s/20 g.

EXAMPLE XIII

To a mixture made in accordance with Example XI was added 4 parts of resin having a polyamide backbone. Immediate sag was 0 and flow was 35 s/20 g. After 30 days in a 50° C. oven, latent sag was 0.2 inch and flow was 75 s/20 g.

EXAMPLE XIV

A mixture was made in accordance with Example XII, except carbon black contained 0.4% moisture. The immediate sag was 0 and flow was 17 s/20 g. After 7 days in a 50° C. oven, latent sag was 0.02 inch and viscosity was 28 s/20 g.

EXAMPLE XV

A mixture was made in accordance with Example XIII, except carbon black contained 0.4% moisture. The immediate sag was 0.03 inch and the flow was 24 s/20 g. After 7 days in a 50° C. oven, latent sag was 0.09 and flow was 60 s/20 g.

The above Example results show the following. In comparative Example XI, although a formulation lacking the resin containing a polyamide backbone exhibited acceptable immediate sag, latent sag was unacceptable for many adhesive applications. Examples XII and XIII each show that addition of relatively small amounts of the resin having a polyamide backbone to the formulation result in a dramatic improvement in latent sag. Examples XIV and XV show that even where moisture is introduced into the formulation, significant improvements in latent sag are exhibited over comparative Example XI.

Again, the key features of the one-part moisture curable polyurethane adhesive composition of the present invention include the utilization of a blend of prepolymers and one or more additives to unexpectedly improve the sag resistance and mechanical properties of the adhesive composition. In particular, the adhesive composition of the invention exhibits improved immediate and latent sag resistance, and cures rapidly and consistently to produce a cured adhesive product having good mechanical properties, regardless of the ambient conditions during cure.

While in accordance with the Patent Statutes, the best mode and preferred embodiments have been set forth, the scope of the invention is not limited thereto, but rather by the scope of the attached claims.

We claim:

1. A polyurethane adhesive composition, comprising: a blend of at least polyurethane Prepolymers A, B, and C, an effective amount of carbon black to improve mechanical properties and sag resistance, and an effective amount of a resin having a polyamide backbone to improve sag resistance, said adhesive composition being a one-part moisture curable system; each said prepolymer being a reaction product of a polyol and an isocyanate, wherein the polyol used in the formation of at least one of said prepolymers is generally incompatible with the polyols used in the formaiton of said other prepolymers, wherein said polyol of each of said prepolymers is a linear or branched polyol having a backbone of polyacrylate, polybutadiene, polycarbonate, polycaprolactone, polyether, polyester, polythioether, or polyurethane, said polyols each having at least two terminal primary and/or secondary hydroxyl groups; wherein said isocyanate of said polyurethane Prepolymer A is an aromatic (poly)isocyanate, wherein said isocyanate of said polyurethane Prepolymer C is an aliphatic or cycloaliphatic (poly)isocyanate and wherein said isocyanate of said polyurethane Prepolymer B is an aromatic (poly)isocyanate or an aliphatic or a cycloaliphatic (poly)isocyanate.

2. The composition of claim 1, wherein said polyol of each of said Prepolymers A and C is a polyether backbone polyol of polyoxyethylene, polyoxypropylene, copolymers of polyoxyethylene and polyoxypropylene, polyoxybutylene, or polyoxytetramethylene, and wherein said polyol of said Prepolymer B is a polyether or a polyester backbone polyol of polyoxyethylene, polyoxypropylene, copolymers of polyoxyethylene and polyoxypropylene, polyoxybutylene, or polyoxytetramethylene, wherein said aromatic (poly)isocyanate of said polyurethane Prepolymer A is 4,4'-diphenylmethanediisocyanate (MDI), toluene diisocyanate, naphthylene-1,5-diisocyanate, 1,3- or 1,4-phenylene-diisocyanate, triphenylmethane-4,4',4''-triisocyanate, poly phenyl-polymethylene polyisocyante, or derivaties thereof, wherein said aliphatic or cycloaliphatic (poly)isocyanate of said polyurethane Prepolymer C is hexamethylene diisocyanate, 1,12-dodecanediisocyanate, cyclobutane-1,3-diisocyanate, cyclohexane-1,3- or 1,4-diisocyanate, 1-isocyanato-3,3,5-trimethyl-5-isocyanate-methylcyclohexane, 2,4- or 2,6-hexahydrotolyenediisocyanate, hexahydro-1,3- or -1,4-phenyidiisocyanate, or perhydro-2,4'- or -4,4'-dicyclohexylmethanediisocyanate ($H_{12}MDI$), and wherein said aromatic (poly)isocyanate of said polyurethane Prepolymer B is 4,4'-diphenylmethanediisocyanate (MDI), toluene diisocyanate, naphthylene-1,5-diisocyanate, 1,3- or 1,4-phenylene-diisocyanate, triphenylmethane-4,4',4''-triisocyanate, poly phenyl-polymethylene polyisocyanate, or derivatives thereof, and wherein said aliphatic or said cycloaliphatic (poly)isocyanate of said polyurethane Prepolymer B is hexamethylene diisocyanate, 1,12-dodecanediisocyanate, cyclobutane-1,3-diisocyanate, cyclohexane-1,3- or -1,4-diisocyanate, 1-isocyanato-3,3,5-trimethyl-5-isocyanate-methylcyclohexane, 2,4- or 2,6-hexahydrotolyenediisocyanate, hexahydro-1,3- or -1,4-phenyidiisocyanate, or perhydro-2,4'or 4,4'-dicylohexylmethanediisocyanate.

3. The composition of claim 2, wherein said polyol of each of said prepolymers A and C is polyoxypropylene triol (PPG), and said polyol of said Prepolymer B is polyoxytetramethylene (PTMG) or polycaprolactone (PCL); and wherein said isocyanate of each of said Prepolymers A and B is MDI and said isocyanate of said Prepolymer C is $H_{12}MDI$.

4. The composition of claim 3, wherein said carbon black additive is a carbon black conforming to ASTM N330; wherein the molecular weight of each of said Prepolymers A and C is from about 1,000 to about 20,000; wherein the functionality of each of said Prepolymers A, B, and C is from about 1.6 to about 3.0; and wherein the amount of Prepolymers A, B, and C utilized per 100 parts by weight of the blend of prepolymers is from about 98 to about 50 parts of Prepolymer A, from about 1 to about 10 parts of Prepolymer B, and from about 1 to about 40 parts of Prepolymer C.

5. The composition of claim 4, wherein the molecular weight of each of said Prepolymers A and C is from about 2,000 to about 7,000; wherein the amount of said Prepolymers A, B, and C utilized per 100 parts by weight of the blend of prepolymers is from about 79 to about 67 parts of Prepolymer A, from about 1 to about 3 parts of Prepolymer B, and from about 20 to about 30 parts of Prepolymer C; wherein said carbon black is utilized in an amount of from about 6 to about 24 weight percent based on the weight of said adhesive composition; and wherein said resin having a polyamide backbone is utilized in an amount of from about 0.2 to about 10 weight percent based on the weight of said adhesive composition.

6. The composition of claim 5, wherein the molecular weight of said Prepolymers A and C each is from about 4,000 to about 7,000; wherein the molecular weight of said Prepolymer B is from about 500 to about 3,000; wherein the functionality-of said Prepolymers A, B, and C each is from about 1.7 to about 2.4; wherein the amount of said Prepolymers A, B, and C utilized per 100 parts by weight of the blend of prepolymers is about 68 parts for Prepolymer A, about 2 parts for Prepolymer B, and about 30 parts for Prepolymer C; wherein said carbon black is utilized in an amount of from about 16 to about 20 weight percent based on the weight of said adhesive composition; and wherein said resin having a polyamide backbone is utilized in an amount of from about 1 to about 4 weight percent based on the weight of said adhesive composition.

7. The composition of claim 6, wherein said adhesive composition includes first and second cocatalysts designated as Cocatalysts I and II, respectively; wherein said Cocatalyst I is an organometallic catalyst and said Cocatalyst II is a tertiary amine or a nitrogen containing material other than said tertiary amine; wherein said Cocatalysts I and II each is used in an amount of from about 0 to about 2 weight percent based on the weight of said adhesive composition.

8. The composition of claim 7, wherein said organometallic catalyst of Cocatalyst I is i) napthenate or octoate salts of tin, lead, bismuth, cobalt, or manganese, or ii) organometallic compounds of dibutyl tin malate, dibutyl tin dilaurate, or dibutyl tin diacetate; wherein said tertiary amine or nitrogen-containing materials of Cocatalyst II is N-alkyl morphiline, N-alkyl aliphatic polyamine, N-alkyl piperazine, triethylene diamine, bis-2-N,N-dimethylaminoethyl ether, or dimorpholinodiethyl ether (DMDEE); wherein said Cocatalysts I and II each is utilized in an amount of from about 0 to about 0.5 weight percent based on the weight of said adhesive composition.

9. The composition of claim 8, wherein said Cocatalyst I is dibutyl tin diacetate and is utilized in an amount from about 0 to about 0.3 weight percent based on the weight of said adhesive composition; and wherein said Cocatalyst 11 is DMDEE and is utilized in an amount from about 0 to about 0.19 weight percent based on the weight of said adhesive composition.

10. A polyurethane adhesive composition, comprising: a blend including at least two polyurethane prepolymers selected from Prepolymers A, C, or B, other than the blend of Prepolymers A and C, and an effective amount of carbon black to improve mechanical properties and sag resistance; wherein said adhesive composition is a one-part moisture curable system; each said prepolymer being a reaction product of a polyol and an isocyanate, wherein the polyol used in the formation of at least one of said prepolymers is generally incompatible with the polyols used in the formation of said other prepolymers, wherein said polyol of each of said prepolymers is a linear or branched polyol having a backbone of polyacrylate, polybutadiene, polycarbonate, polycaprolactone, polyether, polyester, polythioether, or polyurethane, said polyols each having at least two terminal primary and/or secondary hydroxyl groups; wherein said isocyanate of said polyurethane Prepolymer A is an aromatic (poly)isocyanate, wherein said isocyanate of said polyurethane Prepolymer C is an aliphatic of cycloaliphatic (poly)isocyanate, and wherein said isocyanate of said polyurethane Prepolymer B is an aromatic (poly)isocyanate or an aliphatic or a cycloaliphatic (poly)isocyanate.

11. The composition of claim 10 wherein said polyol of each of said Prepolymers A and C is a polyether backbone polyol polyoxyethylene, polyoxypropylene, copolymers of polyoxyethylene and polyoxypropylene, polyoxybutylene, or polyoxytetramethylene, and wherein said polyol of said Prepolymer B is a polyether or a polyester backbone polyol polyoxyethylene, polyoxypropylene, copolymers of polyoxyethylene and polyoxypropylene, polyoxybutylene, or polyoxytetramethylene, wherein said aromatic (poly)isocyanate of said polyurethane Prepolymer A is 4,4'-diphenylmethanediisocyanate (MDI), toluene diisocyanate, naphthylene-1,5-diisocyanate, 1,3- or 1,4-phenylenediisocyanate, triphenylmethane-4,4',4"-triisocyanate, poly phenyl-polymethylene polyisocyanate, or derivatives thereof, wherein said aliphatic or cycloaliphatic (poly)isocyanate of said polyurethane Prepolymer C is hexamethylene diisocyanate, 1,12-dodecanediisocyanate, cyclobutane-1,3-diisocyanate, cyclohexane-1,3- or 1,4-diisocyanate, 1-isocyanato-3,3,5-trimethyl-5-isocyanate-methylcyclohexane, 2,4- or 2,6-hexahydrotolyenediisocyanate, hexahydro-1,3- or -1,4-phenyldiisocyanate, or perhydro-2,4'- or -4,4'-dicyclohexylmethanediisocyanate ($H_{12}$MDI), and wherein said aromatic (poly)isocyanate of said polyurethane Prepolymer B is 4,4'-diphenylmethanediisocyante (MDI), toluene diisocyanate, naphthylene-1,5-diisocyanate, 1,3- or 1,4-phenylene-diisocyanate, triphenylmethane-4,4',4"-triisocyanate, poly phenyl-polymethylene polyisocyanate, or derivatives thereof, and wherein said aliphatic or said cycloaliphatic (poly)isocyanate of said polyurethane Prepolymer B is hexamethylene diisocyanate, 1,12-dodecanediisocyanate, cyclobutane-1,3-diisocyanate, cyclohexane-1,3- or -1,4-diisocyanate, 1-isocyanato-3,3,5-trimethyl-5-isocyanate-methylcyclohexane, 2,4- or 2,6-hexahydrotolyenediisocyanate, hexahydro-1,3- or 1,4-phenyldiisocyanate, or perhydro-2,4' or 4,4'-dicyclohexylmethane-diisocyanate.

12. The composition of claim 11, wherein said polyol of each of said prepolymers A and C is polyoxypropylene triol (PPG), and said polyol of said Prepolymer B is polyoxytetramethylene (PTMG) or polycaprolactone (PCL); and wherein said isocyanate of each of said Prepolymers A and B is MDI and said isocyanate of said Prepolymer C is $H_{12}$MDI.

13. The composition of claim 12, wherein said blend of polyurethane prepolymers includes Prepolymers A, B, and C; wherein said carbon black additive is a carbon black conforming to ASTM N330; wherein the molecular weight of each of said Prepolymers A and C is from about 1,000 to about 20,000; wherein the functionality of each of said Prepolymers A, B, and C is from about 1.6 to about 3.0; and wherein the amount of Prepolymers A, B, and C utilized per 100 parts by weight of the blend of prepolymers is from about 98 to about 50 parts of Prepolymer A, from about 1 to about 10 parts of Prepolymer B, and from about 1 to about 40 parts of Prepolymer C.

14. The composition of claim 13, wherein the molecular weight of each of said Prepolymers A and C is from about 2,000 to about 7,000; wherein the amount of said Prepolymers A, B, and C utilized per 100 parts by weight of the blend of prepolymers is from about 79 to about 67 parts of Prepolymer A, from about 1 to about 3 parts of Prepolymer B, and from about 20 to about 30 parts of Prepolymer C; wherein said carbon black is utilized in an amount of from about 6 to about 24 weight percent based on the weight of said adhesive composition.

15. The composition of claim 14, wherein the molecular weight of said Prepolymers A and C each is from about 4,000 to about 7,000; wherein the molecular weight of said Prepolymer B is from about 500 to about 3,000; wherein the functionality of said Prepolymers A, B, and C each is from about 1.7 to about 2.4; wherein the amount of said Prepolymers A, B, and C utilized per 100 parts by weight of the blend of prepolymers is about 68 parts for Prepolymer A, about 2 parts for Prepolymer B, and about 30 parts for Prepolymer C; wherein said carbon black is utilized in an amount of from about 16 to about 20 weight percent based on the weight of said adhesive composition.

16. The composition of claim 15, wherein said adhesive composition includes first and second cocatalysts designated as Cocatalysts I and II, respectively; wherein said Cocatalyst I is an organometallic catalyst and said Cocatalyst 11 is a tertiary amine or other nitrogen containing material; wherein said Cocatalysts I and 11 each is used in an amount of from about 0 to about 2 weight percent based on the weight of said adhesive composition.

17. The composition of claim 16, wherein said organometallic catalyst of Cocatalyst I is (i) napthenate or octoate salts of tin, lead, bismuth, cobalt, or manganese, or (ii) organometallic compounds of dibutyl tin malate, dibutyl tin dilaurate, or dibutyl tin diacetate; wherein said tertiary amine or nitrogen-containing materials of Cocatalyst II is N-alkyl morphiline, N-alkyl aliphatic polyamine, N-alkyl piperazine, triethylene diamine, bis-2-N,N-dimethylaminoethyl ether, or dimorpholinodiethyl ether (DMDEE); wherein said Cocatalysts I and II each is utilized in an amount of from about 0 to about 0.5 weight percent based on the weight of said adhesive composition.

18. The composition of claim 17, wherein said Cocatalyst I is dibutyl tin diacetate and is utilized in an amount from about 0 to about 0.3 weight percent based on the weight of said adhesive composition; and wherein said Cocatalyst II is DMDEE and is utilized in an amount from about 0 to about 0.19 weight percent based on the weight of said adhesive composition.

19. A polyurethane adhesive, comprising:
a blend including at least two polyurethane prepolymers selected from Prepolymers A, B, or C, other than the blend of Prepolymers A and B, and an effective amount of carbon black to improve mechanical properties and sag resistance; wherein said adhesive composition is a one-part moisture curable system; each said prepolymer being a reaction product of a polyol and an isocyanate, wherein the polyol used in the formation of said Prepolymer B is generally incompatible with the polyols used in the formation of said other prepolymers, wherein said polyol of each of said prepolymers is a linear or branched polyol having a backbone of polyacrylate, polybutadiene, polycarbonate, polycaprolactone, polyether, polyester, polythioether, or polyurethane, said polyols each having at least two terminal primary and/or secondary hydroxyl groups; wherein said isocyanate of said polyurethane Prepolymer A is an aromatic (poly)isocyanate, wherein said isocyanate of said polyurethane Prepolymer C is an aliphatic or cycloaliphatic (poly)isocyanate, and wherein said isocyanate of said polyurethane Prepolymer B is an aromatic (poly)isocyanate or an aliphatic or a cycloaliphatic (poly)isocyanate.

20. The composition of claim 19, wherein said polyol of each of said Prepolymers A and C is a polyether backbone polyol of polyoxyethylene, polyoxypropylene, copolymers of polyoxyethylene and polyoxypropylene, polyoxybutylene, or polyoxytetramethylene, and wherein said polyol of said Prepolymer B is a polyether or a polyester backbone polyol of polyoxyethylene, polyoxypropylene, copolymers of polyoxyethylene and polyoxypropylene, polyoxybutylene, or polyoxytetramethylene, wherein said aromatic (poly)isocyanate of said polyurethane Prepolymer A is 4,4'-diphenylmethanediisocyanate (MDI), toluene diisocyanate, naphthylene-1,5-diisocyanate, 1,3- or 1,4-phenylene-diisocyanate, triphenylmethane-4,4',4'''-triisocyanate, poly phenyl-polymethylene polyisocyanate, or derivatives thereof, wherein said aliphatic or cycloaliphatic (poly)isocyanate of said polyurethane Prepolymer C is hexamethylene diisocyanate, 1,12-dodecanediisocyanate, cyclobutane-1,3-diisocyanate, cyclohexane-1,3- or 1,4-diisocyanate, 1-isocyanato-3,3,5-trimethyl-5-isocyanate-methylcyclohexane, 2,4- or 2,6'-hexahydrotolyenediisocyanate, hexahydro-1,3- or 1,4-phenyldiisocyanate, or perhydro-2,4'- or 4,4'-dicyclohexylmethanediisocyanate ($H_{12}$MDI), and wherein said aromatic (poly)isocyanate of said polyurethane Prepolymer B is 4,4'-diphenylmethanediisocyanate (MDI), toluene diisocyanate, naphthylene-1,5-diisocyanate, 1,3- or 1,4-phenylene-diisocyanate, triphenylmethane-4,4',4'''-triisocyanate, poly pehnyl-polymethylene polyisocyanate, or derivatives thereof, and wherein said aliphatic or said cycloaliphatic (poly)isocyanate of said polyurethane Prepolymer B is hexamethylene diisocyanate, 1,12-dodecanediisocyanate, cyclobutane-1,3-diisocyanate, cyclohexane-1,3- or 1,4-diisocyanate, 1-isocyanato-3,3,5-trimethyl-5-isocyanate-methylcyclohexane, 2,4- or 2,6-hexahydrotolyenediisocyanate, hexahydro-1,3- or -1,4-phenyldiisocyanate, or perhydro-2,4' or 4,4'-dicyclohexylmethane-diisocyanate.

21. The composition of claim 20, wherein said polyol of each of said Prepolymers A and C is polyoxypropylene triol (PPG), and said polyol of said Prepolymer B is polyoxytetramethylene (PTMG) or polycaprolactone (PCL); and wherein said isocyanate of each of said Prepolymers A and B is MDI and said isocyanate of said Prepolymer C is $H_{12}$MDI.

22. The composition of claim 21, wherein said blend of polyurethane prepolymers includes Prepolymers A, B, and C; wherein said carbon black additive is a carbon black conforming to ASTM N330; wherein the molecular weight of each of said Prepolymers A and C is from about 1,000 to about 20,000; wherein the functionality of each of said Prepolymers A, B, and C is from about 1.6 to about 3.0; and wherein the amount of Prepolymers A, B, and C utilized per 100 parts by weight of the blend of prepolymers is from about 98 to about 50 parts of Prepolymer A, from about 1 to about 10 parts of Prepolymer B, and from about 1 to about 40 parts of Prepolymer C.

23. The composition of claim 22, wherein the molecular weight of each of said Prepolymers A and C is from about 2,000 to about 7,000; wherein the amount of said Prepolymers A, B, and C utilized per 100 parts by weight of the blend of prepolymers is from about 79 to about 67 parts of Prepolymer A, from about 1 to about 3 parts of Prepolymer B, and from about 20 to about 30 parts of Prepolymer C; wherein said carbon black is utilized in an amount of from about 6 to about 24 weight percent based on the weight of said adhesive composition.

24. The composition of claim 23, wherein the molecular weight of said Prepolymers A and C each is from about 4,000 to about 7,000; wherein the molecular weight of said Prepolymer B is from about 500 to about 3,000; wherein the functionality of said Prepolymers A, B, and C each is from about 1.7 to about 2.4; wherein the amount of said Prepolymers A, B, and C utilized per 100 parts by weight of the blend of prepolymers is about 68 parts for Prepolymer A, about 22 parts for Prepolymer B, and about 30 parts for Prepolymer C; wherein said carbon black is utilized in an amount of from about 16 to about 20 weight percent based on the weight of said adhesive composition.

25. The composition of claim 24, wherein said adhesive composition includes first and second cocatalysts designated as Cocatalysts I and II, respectively; wherein said Cocatalyst I is an organometallic catalyst and said Cocatalyst II is a tertiary amine or other nitrogen containing material; wherein said Cocatalysts I and II each is used in an amount of from about 0 to about 2 weight percent based on the weight of said adhesive composition.

26. The composition of claim 25, wherein said organometallic catalyst of Cocatalyst I is (i) napthenate or octoate salts of tin, lead, bismuth, cobalt, or manganese, or (ii) organometallic compounds of dibutyl tin malate, dibutyl tin dilaurate, or dibutyl tin diacetate; wherein said tertiary amine or nitrogen-containing materials of Cocatalyst II is N-alkyl morphiline, N-alkyl aliphatic polyamine, N-alkyl piperazine, triethylene diamine, bis-2-N,N-dimethylaminoethyl ether, or dimorpholinodiethyl ether (DMDEE); wherein said Cocatalysts I and II each is utilized in an amount of from about 0 to about 0.5 weight percent based on the weight of said adhesive composition.

27. The composition of claim 26, wherein said Cocatalyst I is dibutyl tin diacetate and is utilized in an amount from about 0 to about 0.3 weight percent based on the weight of said adhesive composition; and wherein said Cocatalyst II is DMDEE and is utilized in an amount from about 0 to about 0.19 weight percent based on the weight of said adhesive composition.

28. A composition of claim 10, including an aliphatic or cycloaliphatic (polyisocyanate).

29. A composition of claim 13, including a cycloaliphatic (polyisocyanate).

30. A composition of claim 16, including $H_{12}MDI$.

* * * * *